United States Patent [19]
Stegmeier

[11] 3,922,131
[45] Nov. 25, 1975

[54] APPARATUS FOR COMPACTING A LOW DENSITY FOAM MATERIAL INTO A HIGH DENSITY FOAM MATERIAL

[76] Inventor: William J. Stegmeier, 1021 C Shary Circle, Concord, Calif. 94521

[22] Filed: June 18, 1973

[21] Appl. No.: 371,253

[52] U.S. Cl. .............. 425/223; 241/190; 264/48; 425/196; 425/455; 425/817 C
[51] Int. Cl.² ................................... B29D 27/04
[58] Field of Search ........... 425/335, 336, 337, 223, 425/363, 4 C, 817 C, 297, 367, 368, 455, 202, 203, 204, 205, 209, 200, 143, 196; 259/9, 10, 45, 46; 264/349, 175, 140, 48, 37; 164/277, 263; 241/88.4, 190, 243

[56] References Cited
UNITED STATES PATENTS

| | | | |
|---|---|---|---|
| 2,629,129 | 2/1953 | Hanson et al. | 425/196 |
| 2,806,249 | 9/1957 | Craig | 425/4 C X |
| 2,806,250 | 9/1957 | Wallis | 425/223 |
| 2,838,801 | 6/1958 | DeLong et al. | 264/37 X |
| 3,229,921 | 1/1966 | Hess et al. | 241/190 |
| 3,632,258 | 1/1972 | Faerber | 425/223 |
| 3,804,151 | 4/1974 | Barsukov et al. | 164/263 |

Primary Examiner—Robert D. Baldwin
Assistant Examiner—Mark Rosenbaum
Attorney, Agent, or Firm—C. Michael Zimmerman, Esq.

[57] ABSTRACT

Apparatus for and method of compacting thermoplastic materials such as expanded or foam polystyrene. The apparatus includes a hopper for receiving quantities of the material therein either as chunks or as a pulverulent mass; and in the case of large pieces or chunks, breaker mechanism is included in association with the hopper for reducing such chunks to smaller units. Compaction mechanism in communication with the outlet of the hopper provides heated rollers that engage the material and elevate the temperature thereof to the softening point, thereby enabling the material to fuse into a higher density mass; that reduce or restrict the thickness of the material to a dimension enabling relatively rapid heat transmission therethrough; and that deliver the fused mass in sheet-like form which may naturally accumulate in accordion-type folds or be further compacted by coiling the sheet into a generally cylindrical roll. The method includes heating a low density mass of thermoplastic foam material, restricting the thickness thereof essentially to a surface layer, and compressing the same at an elevated temperature into a higher density mass.

1 Claim, 8 Drawing Figures

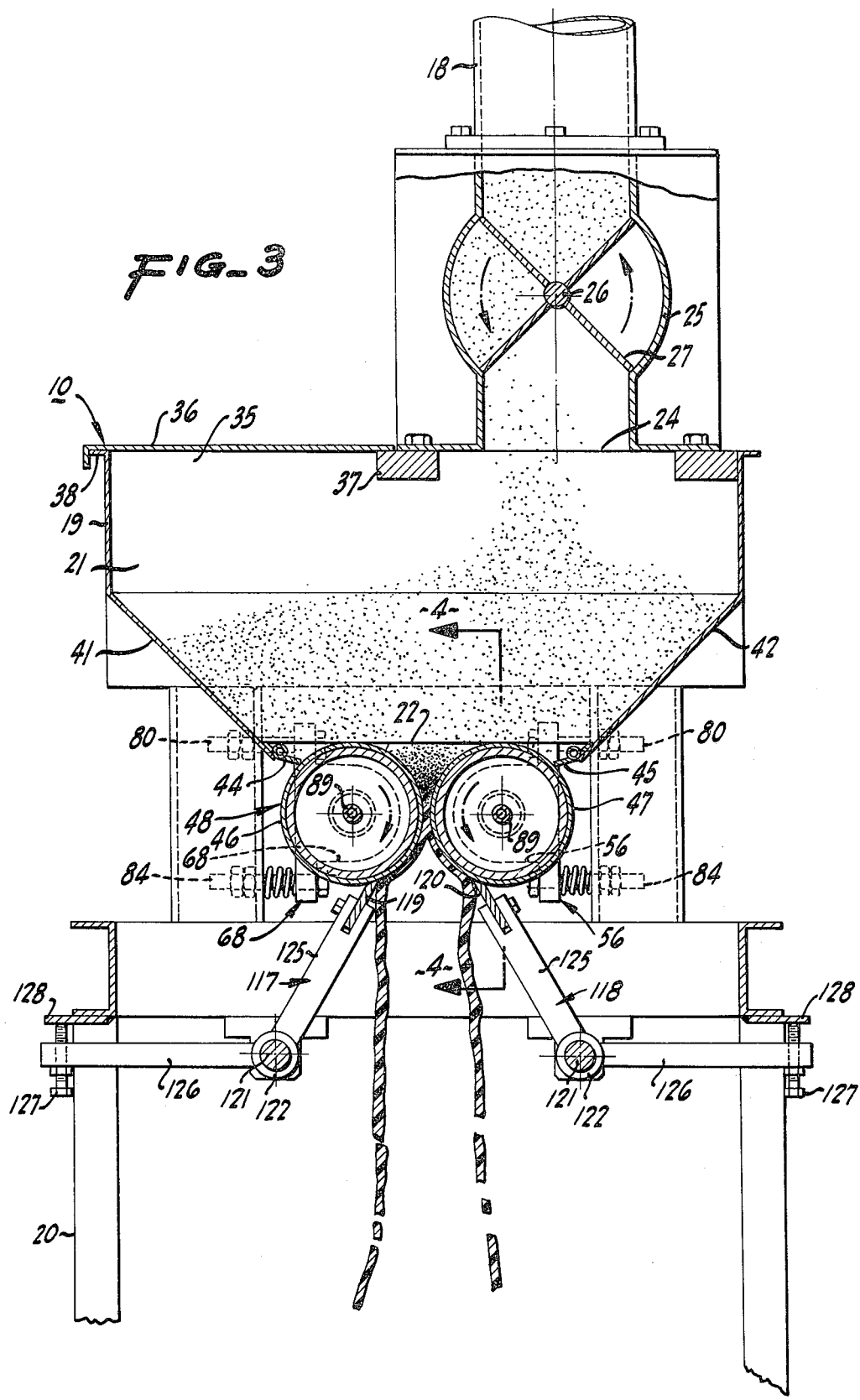

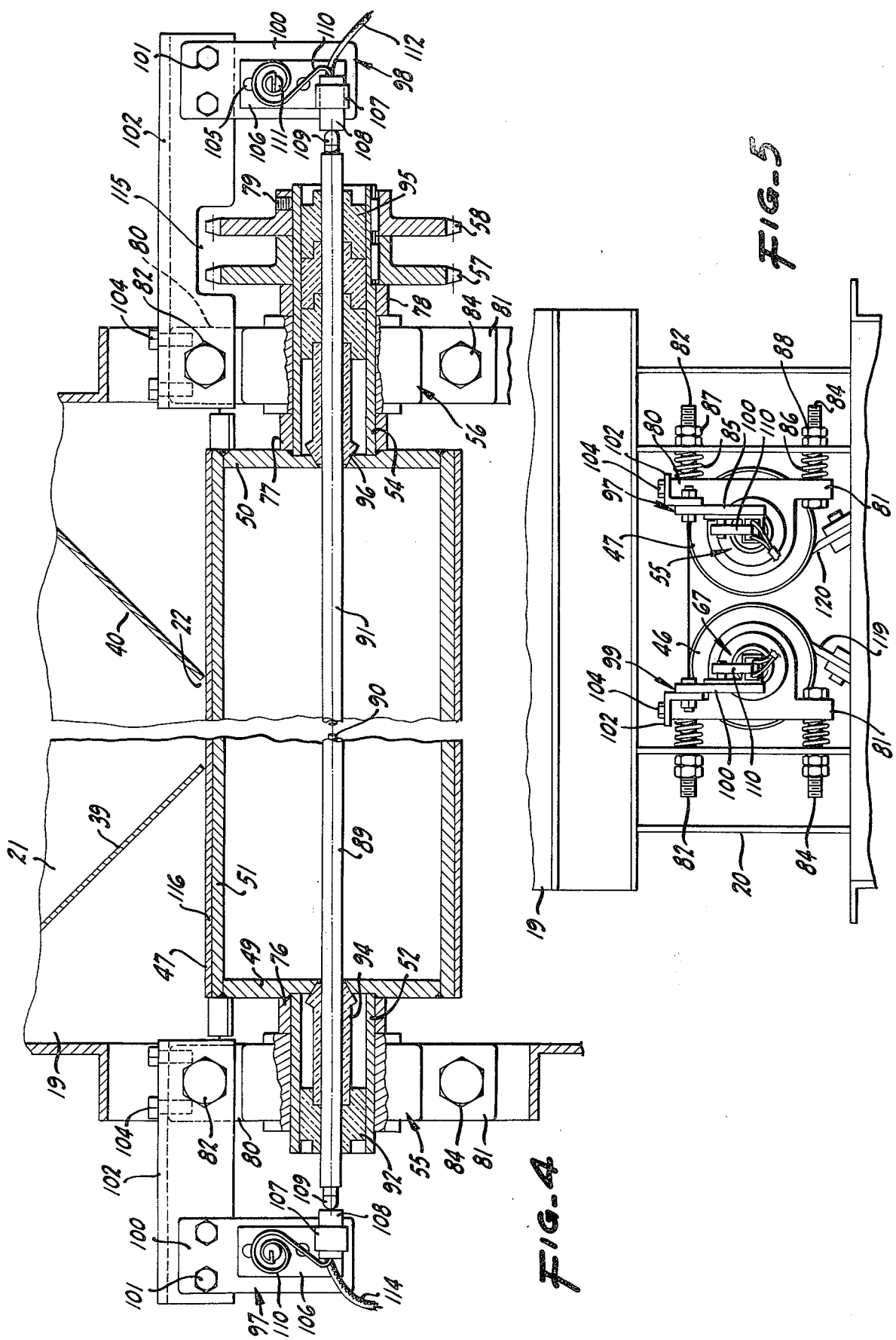

APPARATUS FOR COMPACTING A LOW DENSITY FOAM MATERIAL INTO A HIGH DENSITY FOAM MATERIAL

This invention relates to apparatus for, and to a method of, reducing a low density mass of material to a higher density mass thereof; and it relates more particularly to the reduction of thermoplastic products and materials of low density into solid, high-density masses. As a specific example, the invention is especially useful with thermoplastic foam materials such as expanded polystyrene.

There are many products and materials that in their ordinary state of usefulness have a large volume and are of low density, and once large-volume, low-density forms of such products and materials are no longer required, storage, handling, and disposition thereof become inconvenient and space-consuming and often pose a problem that is expensive of solution. As an example, foam plastic materials are of this type since they are lightweight, of large volume, and therefore have a low density, all of which characteristics are advantageous in the use of products made therefrom but become undesirable upon consummation of such uses. Accordingly, in large scale commercial operations in which vast quantities of these materials are employed, disposal of the scrap poses a very expensive problem because disposal charges are based largely on bulk quantity, and one that entails considerable inconvenience in handling and transportation and, heretofore, has imposed an ecological burden on the community in that considerable space is required for disposition of those materials.

In this respect, foam plastic materials such as expanded polystyrene and polyurethane are used extensively in the packaging industry to protect products from damage and to thermally insulate the same (usually with produce and other foodstuffs), and whether in large pieces, in smaller chunks, or in a pulverulent dust-like mass they occupy a relatively large volume and, although of low density, are not significantly compactible. Similarly, plastic cups and analogous products, although the individual walls thereof may be relatively dense or solid, create the same disposal problems because in toto, they are of large volume and low density. Thus, when such materials must be discarded in disposal areas provided for this purpose either by commercial enterprises or as a governmental function, the space occupied by the discarded materials is tremendously disproportionate to the actual weight of material present.

Respecting cost, disposal charges are based ordinarily on the volume of the material being discarded and, therefore, the cost of disposing a large-volume, low-density mass of material is again disproportionate to the actual quantity of solids present in the total mass. In this respect, it is not unusual for a plastic processer of modest size to spend several hundred dollars each month in disposal charges for the scrap plastic that has no other use, and were it ever feasible to recycle the same, it cannot be done economically because of the transportation costs incident to the large volume occupied thereby.

As far as is known, there is no satisfactory technique or procedure now available to foam plastic processors and users, or to others such as airlines using plastic cups and like products, for reducing the low density mass of material defined by the thermoplastic materials and products in either their whole or pulverulent form to a higher density mass thereof which can be handled conveniently, disposed of economically, and recycled where feasible because of the commercial practicability of transporting the higher density form of such materials; and it is, accordingly, an object of this invention to provide such a system or technique.

Still another object of this invention is in the provision of an improved apparatus for the method of reducing a low density mass of material to a higher density mass thereof including expanded or foam plastics such as polystyrene, polyethylene, polyurethane and like thermoplastic materials.

Still another object of the invention is that of providing apparatus of the character described having compaction mechanism in communication with a receiver for accepting material therefrom and operative to concentrate such material from the lower density mass thereof into a higher density mass; such compaction mechanism including both heater structure for elevating the temperature of such material to the softening temperature thereof to enable the same to fuse into a higher density mass, and compression structure for limiting the thickness of the mass to a dimension having an acceptable time parameter for heat transmission therethrough to soften the same quickly; and such compaction mechanism further including in certain forms of the apparatus means for producing relatively continous streamers of sheet-like material and for coiling the same into a compact roll.

A further object of the invention is to provide a method of reducing a low density mass of material to a higher density mass thereof, as previously explained, in which such material is a thermoplastic and is heated to the softening temperature thereof, is confined in thickness to a dimension that affords an acceptable time parameter for heat transmission therethrough, and is fused into a higher density mass.

Additional objects and advantages of the invention, especially as concerns particular features and characteristics thereof, will become apparent as the specification continues.

Embodiments of the invention are illustrated in the accompanying drawings, in which:

FIG. 3 is a broken transverse vertical sectional view taken along the line 3—3 of FIG. 2;

FIG. 4 is a further enlarged broken longitudinal sectional view taken along the line 4—4 of FIG. 3;

FIG. 5 is a broken end view in elevation looking from left to right in FIG. 4;

Figure 1:
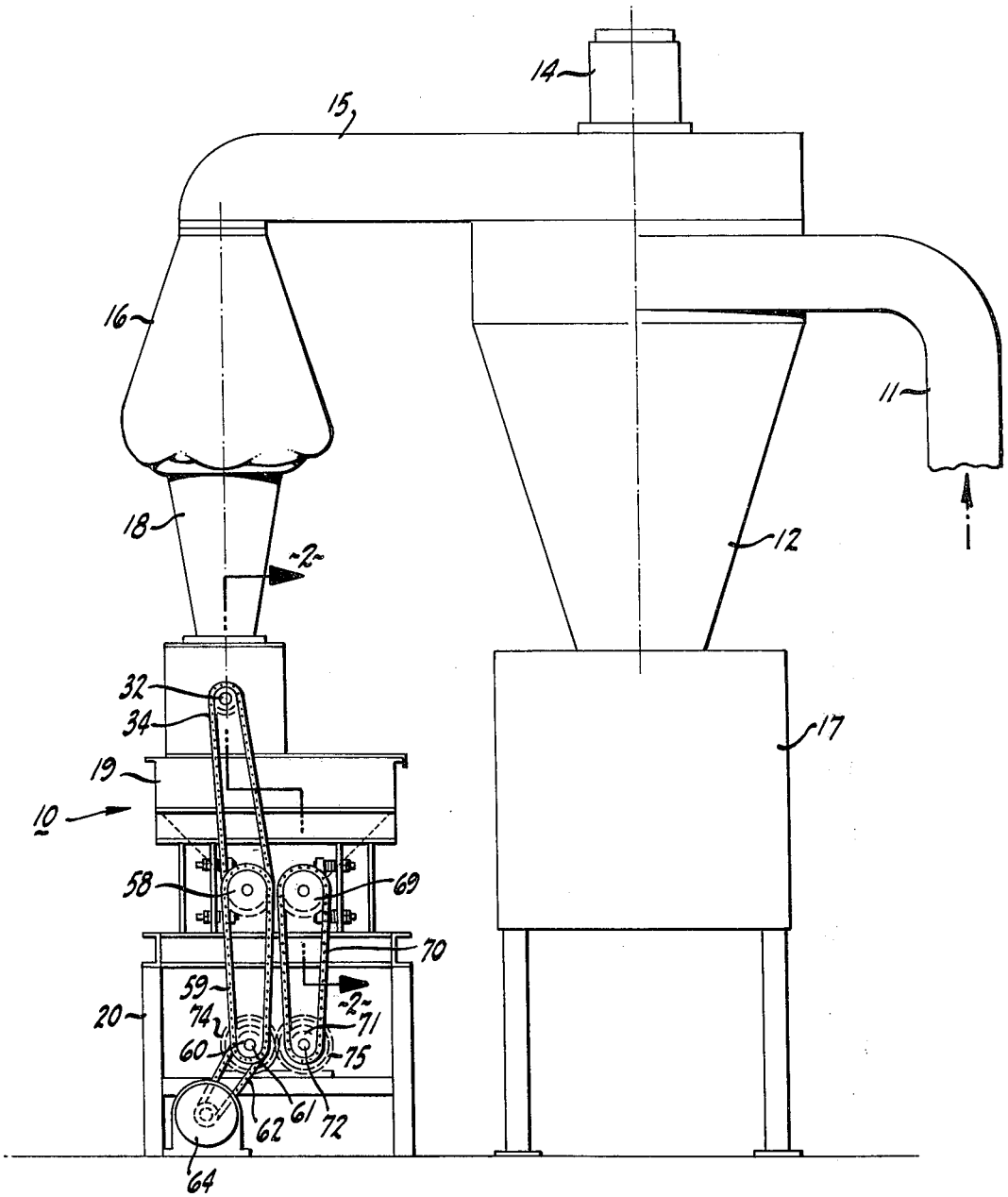
FIG. 1 is an end view in elevation of the apparatus shown in operative association with a processing mechanism that produces dust or particulate plastic as an undesirable by-product of its function.

Apparatus embodying the present invention may be used as a functionally independent, self-contained unit, or it may be used in functional association with other apparatus, all as will become more apparent hereinafter. In FIG. 1, the apparatus 10 is illustrated in operative association with a machine (not shown) which may take a variety of forms and have many different uses depending upon the particular environmental setting in which it resides. In the particular apparatus shown in FIG. 1, the machine is used to grind shapes or configurations into plastic foam billets as a result of which the material abraded therefrom is dust-like or pulverulent in character. As a specific example, the machine may be used to produce from expanded polystyrene foam billets disposable mold forms of the character disclosed in U.S. Pat. application Ser. No. 761,726, filed Sept. 23, 1968.

The relatively large volume of particulate material produced by the abrading operation performed in the machine is accumulated in an exhaust system including an exhaust conduit 11 that communicates with and defines the infeed to a cyclone-type separator 12. The separator 12 may be substantially conventional, and it includes the usual motorized blower unit 14 that draws particle-laden air through the conduit 11 and into the separator. Air exits from the separator 12 via discharge conduit 15 having an exhaust filter 16 of the cloth bag type through which air escapes to the atmosphere in a substantially particle-free state. The separator 12 has two modes of operation, one in which it functions in a substantially conventional manner to discharge a large quantity of the particulate matter entrained in the exhaust air entering the separator through the conduit 11 into a collection chamber 17 communicating with the restricted lower end portion of the inverted, frustoconical separator. The alternate mode of operation is that in which substantially all of the particulate matter is permitted to bypass the separator and flow directly into the discharge conduit 15 and exhaust filter 16 thereof into a pressurized delivery system 18 communicating with the apparatus 10.

The collection space 17 communicating with the separator 12 is used whenever the apparatus 10 is inoperative. That is to say, the capacity of the apparatus 10 may significantly exceed the exhaust rate of the machine with which the apparatus is associated. In that case, it may be advantageous to operate the apparatus 10 periodically whenever the quantity of material accumulated in the collection space 17 makes operation of the apparatus economically advantageous. Control mechanism (not shown) in the form of valves or flow-control devices are included to enable the separator 12 to be conditioned for either mode of operation.

The particulate or pulverulent material delivered to the apparatus 10 either continuously through the pressurized delivery system 18 thereof or manually by periodic removal from the collector 17 and delivery to the apparatus in the manner hereinafter described is a low density mass of material. Generally stated, the apparatus 10 is operative to reduce such a low density mass of material to a higher density mass thereof which therefore occupies a significantly smaller volume and is easier to handle whether discarded or processed for subsequent reuse. Such low density mass of material which, as will become more evident hereinafter, will be a heat-sensitive material such as one of the thermoplastic materials including expanded plastic foam as, for example, expanded polystyrene foam either open or closed cell. Such material is delivered to a receiver 19 suitably supported by frame structure 20 of conventional construction that includes a plurality of U-shaped channels, angle irons, and similar components rigidly interconnected in appropriate vertical and horizontal orientation so as to provide the requisite strength and stability for the apparatus. Certain of the vertical elements of the frame structure 20 are adapted to seat upon a floor surface, as shown in FIG. 1.

Figure 2:
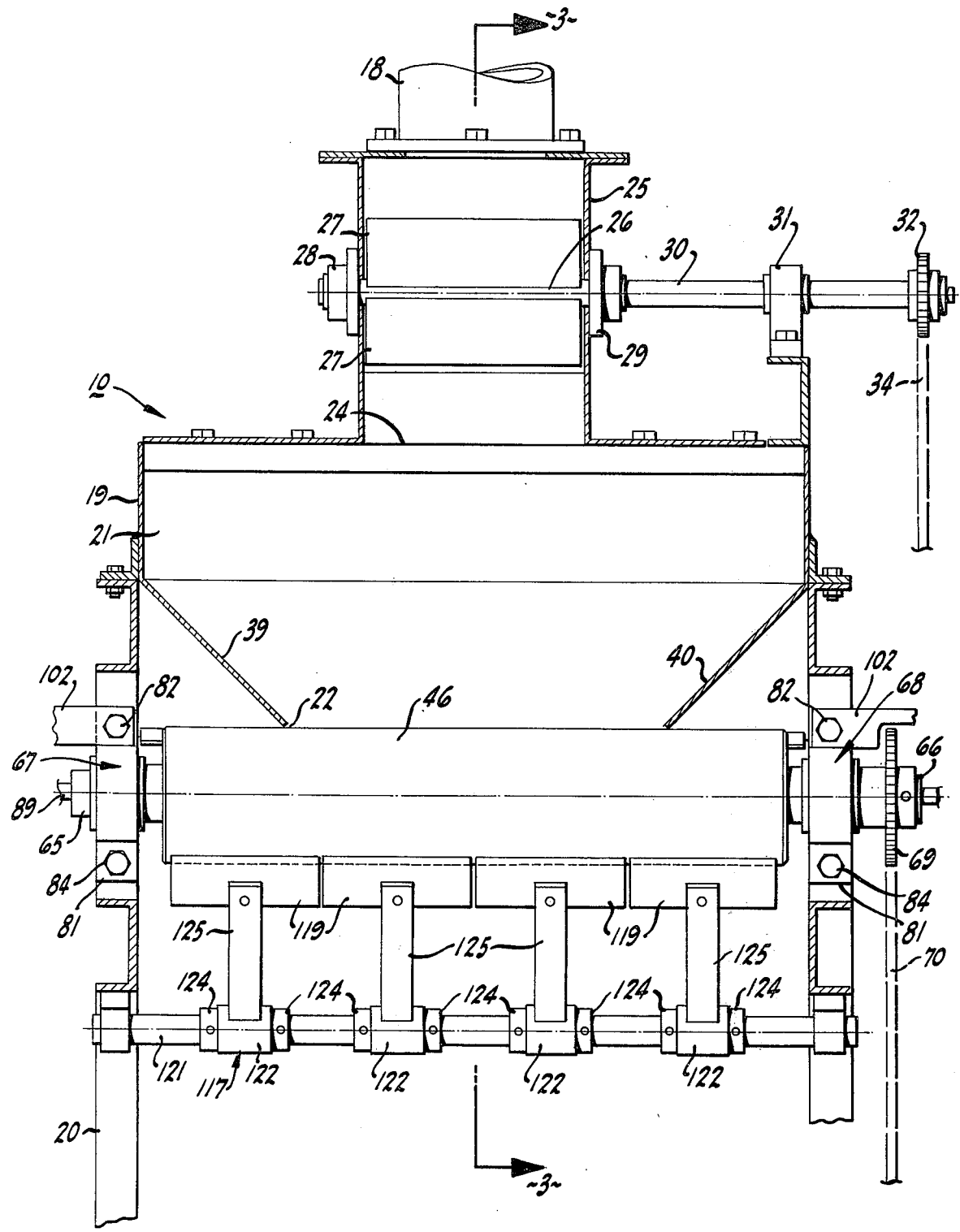
FIG. 2 is an enlarged broken vertical longitudinal sectional view taken along the line 2—2 of FIG. 1.

Referring to FIG. 2 and 3 in particular, it will be seen that the receiver 19 is in the form of a hopper having a large chamber 21 somewhat in the configuration of an inverted truncated pyramid throughout its lower end portion so as to direct material within the compartment to an outlet 22 with which the receiver is provided adjacent its lower end. The receiver is also provided adjacent the upper end thereof with an inlet 24 through which quantities of a low density material are admitted to the chamber 21, as shown best in FIG. 3.

The inlet 24 communicates with the aforementioned pressurized delivery system 18 which includes an airlock valve 25 of essentially conventional design that is operaive to transfer material into the receiver compartment 21 through the inlet 24 and, at the same time, to substantially pressure isolate the compartment 21 from the pressure section of the delivery system 18. Accordingly, the valve 25 is a rotary valve having a rotor 26 provided with a plurality of dividers or baffles 27 (four equally spaced baffles in the particular embodiment of the invention being considered) that define compartments therebetween that successively align with the conduit of the system 18 to receive material therefrom and then transfer such material by angular displacement into the chamber 21 through the inlet 24 thereof.

The rotor 26 is journaled for rotation in bearings 28 and 29 attached to the outer casing walls of the valve 25. Adjacent the bearing 29, the rotor is connected with a drive shaft 30 supported for rotation in a bearing 31 mounted upon an element of the frame structure 20. Adjacent its outer end, the drive shaft 30 is equipped with a sprocket 32 having a drive chain 34 entrained thereabout. As explained subsequently, the sprocket 32, shaft 30, and rotor 26 are rotated continuously whenever the apparatus 10 is in operation so as to provide a relatively continuous infeed of low density material to the chamber 21 of the receiver 19.

As seen in FIG. 3, the chamber 21 has an auxiliary or second inlet opening 35 that is normally closed by a removable cover 36 which may be hingedly supported for movements between open and closed positions or, as in the case of the apparatus 10, is simply removably supported along the longitudinal edges thereof on a support block 37 located within the chamber 21 and upon an outwardly turned lip 38 provided by the outer longitudinal wall of the receiver 19. Ordinarily, the cover 36 is in the closed position shown but is removed to permit manual delivery of materials into the chamber 21 as, for example, from the collector 17.

The outlet 22 of the receiver 19 is defined by the perimetric edge portions of downwardly and inwardly inclined transverse end walls 39 and 40, and longitudinal sidewalls 41 and 42, as respectively shown in FIGS. 2 and 3. Thus, as previously stated, the lower end portion of the receiver 19 is generally funnel-shaped so as to direct material delivered to the receiver at the upper end thereof toward the more restricted discharge outlet 22. The longitudinal sidewalls 41 and 42 are respectively provided at the lower edges thereof with hinged flaps 44 and 45 that are gravity-biased downwardly so as to ride along the cylindrical surfaces of respectively associated rollers 46 and 47 which will be described in detail hereinafter. The flaps 44 and 45 essentially confine material moving downwardly along the respectively associated sidewalls 41 and 42 to engagement with the roller surfaces. However, they permit any large collections of material teding to adhere to the cylindrical surfaces of the rollers to pass upwardly toward the interior of the receiver 19. Accordingly, the rollers 46 and 47 respectively rotate in clockwise and counterclockwise directions as viewed in FIG. 3.

The apparatus 10 further includes compaction mechanism in communication with the outlet 22 for receiving material therefrom and operative to concentrate such material into a higher density mass. The compaction mechanism is denoted generally with the numeral 48, and it includes rollers structure comprising the aforementioned rollers 46 and 47. The compaction mechanism 48 further includes heater structure for heating the material leaving the receiver chamber 21 via the outlet 22 to the softening temperature of the material to enable the same to fuse into a higher density mass. The rollers 46 and 47 serve as a compression structure for pressing such heat-softened material into a fused mass which is taken from the rollers in the form of streamers of sheet-like character, as indicated in FIG. 3.

Each of the rollers 46 and 47 is a hollow cylinder, as shown in FIGS. 3 and 4, having longitudinally spaced end walls 49 and 50 welded or otherwise fixedly secured to a cylindrical sleeve 51. The end walls 49 and 50 are respectively equipped with hollow stub shafts 52 and 54 that are axially aligned and respectively journaled for rotation in bearing structures 55 and 56 secured to the frame of the apparatus. The stub shafts 52 and 54 may be welded or otherwise fixedly secured to the respectively associated end walls of the roller, and the stub shaft 54 is equipped at the outer end thereof with a pair of sprockets splined or otherwise related thereto, as shown in FIG. 4, so as to prevent relative rotation therebetween. The outer sprocket 58 is adapted to be driven by an endless chain 59 entrained thereabout (FIG. 1), and the inner sprocket 57 has the aforementioned chain 34 entrained thereabout (FIGS. 1 and 2) so that the rotor 26 of the valve 25 is rotated in mechanically enforced synchronism with the roller 47.

As respects the drive train of the apparatus 10, it will be seen in FIG. 1 that the chain 59 is also entrained about a sprocket 60 keyed to a shaft 61 that is driven through a chain 62 interconnecting the same with an electric motor 64. The roller 46 is also equipped at the opposite ends thereof with hollow stub shafts 65 and 66 journaled for rotation in bearing structures 67 and 68 secured to the frame structure of the appartaus (see FIG. 2); and the shaft 66 has a sprocket 69 keyed thereto that is driven by a chain 70 which is entrained about a sprocket 71 keyed to a shaft 72 (see FIG. 1). The two shafts 61 and 72 are supported for rotation in the frame structure 20, and they are respectively equipped with spur gears 74 and 75 that drivingly mesh. Accordingly, whenever the driver motor 64 is energized, the shafts 61 and 72 are rotatably driven and they, in turn, drive the sprockets 58 and 69 through the respectively associated chains 59 and 70 and thereby concurrently rotate the rollers 46 and 47 in synchronism. At the same time, the valve rotor 26 is driven via the chain 34 and sprocket 32, as previously explained. Suitable but conventional control circuitry (not shown) including a manual switch is included for the motor 64 to control energization thereof.

Returning to FIG. 4, it will be apparent that the longitudinal location of the roller 47 is established by means of spacers 76 and 77 respectively disposed between the end wall 49 and bearing 55 and between the end wall 50 and bearing 56; by means of a spacer 78 interposed between the bearing 56 and inner sprocket 57; and by means of set screw 79 that constrains the sprockets 57 and 58 in longitudinal position along the stub shaft 54. The transverse location of each of the rollers 46 and 47 is determined by the location of the bearing structures respectively associated therewith which are supported by the frame structure 20. However, each roller is resiliently biased toward the predetermined innermost position thereof illustrated in FIGS. 3 and 5 and is displaceable outwardly therefrom against the resilient biasing forces respectively associated therewith. Accommodation of limited transverse displacements of the rollers 46 and 47 enable the same to pass therebetween relatively solid and unusually large blocks of material which otherwise could not be accommodated or would damage the rollers.

The resilient support for each bearing structure is essentially the same, and they are best seen in FIGS. 3 and 5 which show the opposite ends of the two rollers. Each bearing structure is of essentially standard construction and is of the pillow-block type. That is to say, each bearing is equipped with laterally extending mounting ears 80 and 81 (see the bearing structure 55 in FIG. 5) through which mounting bolts 82 and 84 respectively extend. Such bolts also pass through openings provided therefor in an associated member of the frame structure 20, and helical compression springs 85 and 86 respectively circumjacent the bolts 82 and 84 are interposed between such ears 80 and 81 and the facing surface of the frame structure 20. Locknut assemblies 87 and 88 fixedly secure the bolts 82 and 84 to the frame structure, and the extent to which they are tightened upon the respectively associated bolts determine the magnitude of the prestress applied to the springs 85 and 86 and, therefore, the transverse position of the ears 80 and 81 and bearing structure 55 associated therewith. Thus, the roll 47 may be moved outwardly by tightening the nut assemblies 87 and 88, and it may be moved in the opposite direction by loosening such nut assemblies to reduce the compression of the springs. Since the bearing structures are all substantially identical, the same numerals are used to identify the respectively corresponding elements thereof wherever appropriate in the drawings even though the four bearing structures are denoted in their entireties by different numerals for purposes of differentiation therebetween.

As previously stated, the apparatus 10 includes heater structure for heating the material leaving the receiver 19 to the softening temperature to enable the low density mass of material to fuse into a higher density mass thereof. In the particular apparatus 10 being considered, the heater structure is embodied within the rollers 46 and 47 and effects an elevation in the temperature of the outer cylindrical surface thereof which engages the material contacting the same, as shown in FIG. 3. Each of the rollers 46 and 47 is individually heated, and the structure by which this is accomplished is the same in each instance. The structure associated with the roller 47 is illustrated in FIG. 4, and reference will be made to that Figure in particular in describing the heater structure.

As noted hereinbefore, each roller is hollow (it may, of course, be of solid construction having only a central bore therethrough) and extending therethrough coincident with the longitudinal axis or axis of rotation theref is an elongated heating element 89. The heating element 89 may be an ordinary standard heating element such as a Calrod element comprising of an electric resistance component 90 (a Nichrome wire, for example) encapsulated in a dielectric sheath 91 which is usually ceramic. The heating element 89 is sufficiently long to extend entirely through the roller 47 and stub shafts 52 and 54 at the ends thereof, and it is held in an axially centered relationship with respect to the roller and stub shafts by support members provided for this purpose. Thus, the shaft 52 is provided within the interior thereof with supports 92 and 94 which are formed of materials having good heat resistive characteristics such as asbestos and porcelain, respectively. In a completely analogous manner, the elongated support shaft 54 is equipped with a plurality of insulating support 95 substantially the same as the support 92 and connected in end-to-end succession, as shown. An insulator 96 conforming to the aforementioned insulator support 94 is disposed intermediate the end wall 50 of the roller and the aggregate support composition 95. The supports 92 and 94 are fixedly related to the respectively associated shafts 52 and 54 so that they do not move longitudinally with reference thereto.

However, the heating element 89 is longitudinally movable with respect to all of the supports therefor 92, 94 and 95, 96 so that changes in the length of the heating element occasioned by heating and cooling thereof are readily accommodated without resraint which could break or otherwise damage the heating element. Evidently, the electrical connections to the conductor 90 must similarly accommodate changes in the length of the heating element while also accommodating rotational movement thereof. For this purpose, each of the rollers and heating elements thereof have connector structures associated with their opposite ends, those associated with the roller 47 being shown in FIG. 4 and respectively denoted with the numerals 97 and 98. Only one of the units associated with the roller 46 is illustrated in the drawings (see FIG. 5), and it is denoted with the numeral 99. In that all of the connector structures are substantially identical, only the components of one will be described in detail and, where appropriate, the same numerals will be used to identify the respectively corresponding elements of the other structure.

Considering the unit 98, it includes a plate-like hanger 100 secured by a plurality of cap screws 101 to an L-shaped channel 102 adjacent the outer end thereof. Adjacent its opposite end, the channel 102 is fixedly secured to the upper ear 80 of the associated bearing structure 56 by a plurality of cap screws 104. Accordingly, the hanger 100 is fixedly related both in longitudinal and transverse directions to the associated bearing structure 56 and is therefore able to move therewith in transverse directions in the manner previously explained. Fixedly related to the hanger by a plurality of screws 105 is a mounting plate 106 having adjacent its lower end a U-shaped support 107 affixed thereto. A carbon brush 108 is supported in the bracket 107 and is slidable longitudinally with respect thereto. The brush 108 is resiliently biased inwardly into electrical and mechanical engagement with the enlarged contact-equipped end 109 of the heating conductor 90 by a spiral-type leaf spring 110. Adjacent one end, the spring 110 engages the brush 108, and adjacent its opposite end, it is fixed to a post 111 rigidly related to the mounting plate 106. Although the spring 110 urges the brush 108 inwardly against the conductor end 109, the spring enables the brush to be displaced outwardly relative to the holder 107 upon elongation of the heating element 89 owing to thermally induced expansion thereof. The hangers 100 and/or mounting plates 106 are formed of an insulating material to isolate the heating circuit electrically from the metal components of the apparatus.

The brush 108 is an electric conductor, and it is connected with an electric lead or conductor 112 by means of which the heating elemment 89 is energized. The spring 110 provides surficient biasing force to establish the requisite low-resistance connection of the brush 108 with the conductor end 109. The heating element 89 may have both electrical connections thereto made at one end thereof, but in the form shown, the conductor 90 passes through the heating element 89 and is connected at one end to the conductor 112 via the brush 108 and at its opposite end it is connected to a conductor 114 via the associated brush. Thus whenever the heating circuit for the apparatus 10 is energized, current flows between the conductors 112 and 114 through the resistance wire 90 to heat the element 89 and roller associated therewith. It will be noted in FIG. 4 that the support channel 102 is recessed at 115 to accommodate the sprockets 57 and 58, but that a corresponding recess is not required in the support channel adjacent the opposite end of the roller because of the absence of sprockets thereat.

The apparatus 10 further includes means for peeling or stripping fused materials from the rollers 46 and 47, as is made evident in FIG. 3. As respects such removal of fused material from the rollers, each roller may have the cylindrical surface thereof covered with a material that tends to resist adhesion thereto as, for example, a Teflon coating 116 that is seen best in FIG. 4. In the form shown, the removal means are in the form of scraper structures 117 and 118 respectively associated with the rollers 46 and 47. The scraper structures extend substantially from end-to-end of the respectively associated rollers, as is shown in FIG. 2, and each scraper structure may be subdivided into a plurality of scrapers, there being four such scraper units per roller in the specific embodiment of the invention being considered. Such subdivision of the scraper structures into a plurality of individual scraper units enables the scraper blades 119 and 120 respectively associated with such structures to be adjusted more accurtely to the surface of the roller associated therewith.

The scraper structures 117 and 118 are substantially identical, and considering the structure 117, it is seen to include a longitudinally extending support shaft 121 fixedly secured adjacent the opposite end portions thereof to components of the frame structure 20. Pivotally mounted on the shaft 121 are a plurality of longitudinally spaced bell cranks 122 each of which is constrained against longitudinal displacements with respect to the shaft by collars 124 pinned to the shaft on opposite sides of the bell crank. Each bell crank 122 has an upwardly and inwardly extending arm 125 to which the associated scraper or doctor blade 119 is attached such as by providing the arm with a bifurcated end portion spanning the blade to which it is clamped by means of a cap screw. Each bell crank 122 further has an arm 126 disposed in a generally horizontal plane and equipped at its outer end with an adjusting screw 127 adapted to abut a stop plate 128 welded or otherwise fixedly secured to the frame structure 20. As shown in FIG. 3, the adjusting screw 127 is set so that the doctor blade 119 is disposed in substantially contiguous sliding engagement with the surface of the roller 46 in general opposition to the direction of rotation thereof so as to effectively peel fused material from the roller so that it can drop downwardly because of gravitational force. The blades 119 may be made from, or coated with, an adhesion-resistive material such as Teflon which results in the fused material moving downwadly in a relatively straight line from its point of release, as shown in FIG. 3. Each of the four scraper units are individually adjustable as respects the position of the blade 119 thereof with the associated roller surface, thereby providing a more effective removal of the fused material from the roller surface. As previously noted, the scraper structures 117 and 118 are substantially identical and, therefore, the same numerals are used to identify the respectively corresponding elements thereof even though the structures in their entireties are denoted by separate numerals for purposes of differentiating therebetween.

In operation of the apparatus illustrated in FIGS. 1 through 5, a low density mass of material is delivered to the receiver 19 either through the pressurized delivery system 18, manually through the auxiliary or secondary inlet 35, or by some other means preferably in a manner such that the chamber 21 of the receiver has a quantity of material therein at all times since such condition increases the efficiency of the reduction process by means of which the low density mass of material is converted into a higher density mass thereof. Prior to the rollers 46 and 47 being rotatably driven, the heating elements 89 are energized to bring the cylindrical surfaces of the rollers to the desired operating temperature. The rollers 46 and 47 are then placed in operation by energization of the drive motor 64, and the rotary air lock valve 25 is driven therewith, in the manner previously described.

The temperature at the surfaces of the rollers 46 and 47 is sufficient to bring the material contacting the same to the softening temperature thereof to enable the same to fuse into a higher density mass. Also, the rollers 46 and 47 compress the material into intimate contact with the heated surfaces so as to effect a more rapid heat transfer therebetween, and they also serve to compress the heat-softened material into a fused mass and to spread the same generally along the length of the rollers intermediate the inclined transverse end walls 39 and 40 of the receiver 19. As the fused material passes between the rollers 46 and 47, portions of the material tend to cling to the roller surfaces from which such string like or sheet like material (depending for the most part upon the quantity thereof passing between the rollers) is stripped or peeled therefrom by the scraper structures 117 and 118. The material tends to remain cohesive and in its softened state as it depends from the rollers 46 and 47 and scraper structures 117 and 118, collecting therebelow in accordion-type folds either on the floor or in a receptacle provided for receipt thereof. In the case of polystyrene materials, the relatively thin streamers tend to become brittle when cooled, thereby enabling any collection of material to be broken free and removed when desired.

In the event that a lump or other relatively solid mass of material or foreign body therein tends to pass downwardly between the rollers 46 and 47, the resilient support for the bearing structures thereof enable the rollers to separate sufficiently to permit passage of the object with substantially no damage occurring to the surfaces of the rollers. Although the scrapers 117 and 118 are adjustable to enable the blades 119 and 120 thereof to peel the fused material very cleanly from the roller surfaces, in the event that one or more of the scraper units becomes seriously out of adjustment and a mass of the material clings to the roller as it passes the doctor blade, such material freely returns to the interior of the chamber 21 because of the pivotal support of the flaps 44 and 45 which simply swing upwardly to accommodate any such clinging mass of material. The heaters 89 are free to expand and contract longitudinally relative to the respectively associated rollers 46 and 47 and shafts 52 and 54 thereof in accordance with thermally-induced changes because of the contact structures associated therewith, as previously explained.

The material within the receiver chamber 21 is maintained in engagement with the surfaces of the rollers 46 and 47 for a significant period of time due to the substantial angular distance between the points at which the flaps 44 and 45 engage the roller surfaces and the points at which the doctor blades 119 and 120 engage the same. That is to say, as each roller surface moves upwardly toward the associated flap, it first engages material within the receiver chamber 21 at the instant that the surface passes the edge of the flap. The material then engaging the clean surface of the roller remains in contact therewith until it is peeled therefrom by the associated scraper structure. The intimate and prolonged contact of such material with the roller surface enables a surface layer of the material to heat very rapidly as it is carried to a position intermediate the rollers. The initial surface fusion between the various particles progresses to total fusion at the time the material is stripped from the roller by the associated doctor blade, thereby maximizing the density increase imparted to the material which initially is of low density. The mass of material within the chamber 21 of the hopper establishes a thermal insulator restricting escape of heat from the rollers 46 and 47.

This prolonged contact of the material with the rollers is of substantial significance and has several advantages among which is that the rollers can be operated at a much lower temperature than otherwise would be the case. This permits simpler, lighter weight, less expensive components to be used and, in particular, lower wattage heating elements 89. Such lower-capacity heating elements require less energy input, thereby reducing initial installation cost and operational cost of the apparatus. Much more significant however is that many of the materials with which the apparatus has utility release toxic gases at higher temperatures which are avoided by the low-temperature, long-time parameters provided by the described relationship. As a specific example of a particular apparatus used in reducing foam polystyrene to a compact mass, the rollers 46 and 47 are approximately 24 inches long and 5 inches in outside diameter. The rollers are rotated at a velocity in the range of from 15 to 20 rpm, and the heating elements 89 therein are of 1,000 watt capacity each. Such heating elements are able to elevate the temperature of the rollers 46 and 47 to the order of 180°F and to maintain the temperature substantially at that value without thermostatic control during continuous operation of the apparatus.

Figure 7:
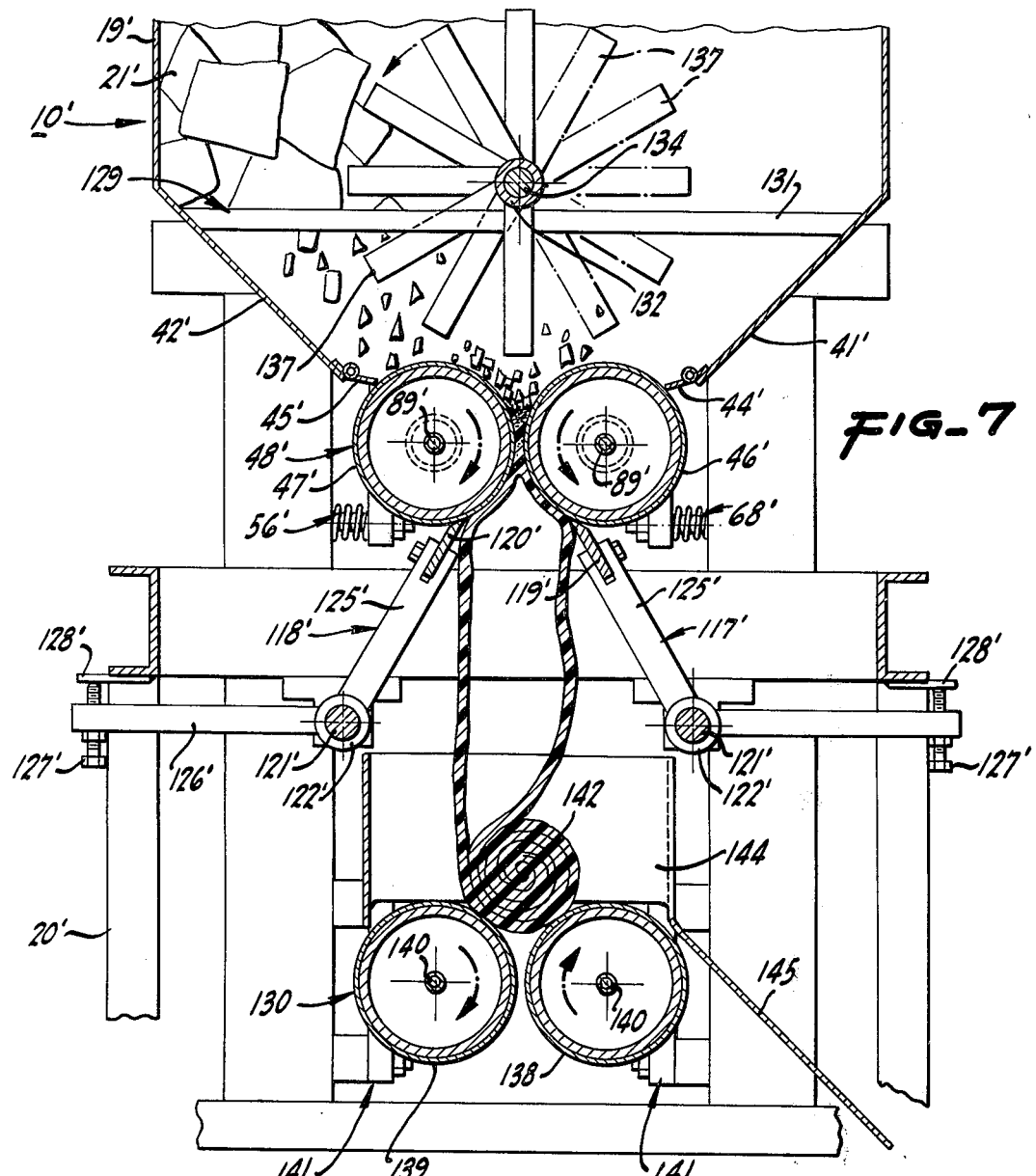
FIG. 7 is a broken transverse sectional view taken along the line 7—7 of FIG. 6.
Figure 8:
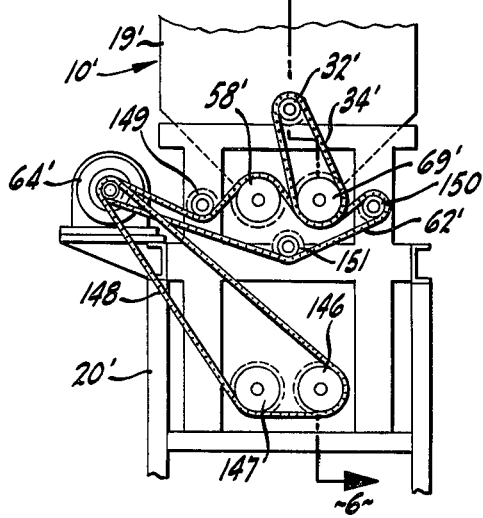
FIG. 8 is a broken end view in elevation, in reduced scale illustrating the drive for the modified form of the invention illustrated in FIGS. 6 and 7.

It will be evident that the foregoing example is set forth for purposes of exemplification and that the dimensions and parameters noted can be varied greatly to tailor the apparatus to the specific requirements of any particular environment and material with which the apparatus is to be used. Similarly, the particular apparatus noted performs advantageously without thermostatic control, but such control devices can be incorporated and may be of any standard type The apparatus 10 is especially suited for use with material that is relatively small when delivered to the receiver 19, although it does not necessarily need to be pulverulent or particulate in character. It will also function with larger pieces of material delivered to the receiver 19, but it will not function as efficiently as with smaller material sizes. On the other hand, in many environments the material to be delivered to the receiver 19 consititutes relatively large pieces such as scrap and rejects, for example, and in these situations it is advantageous to incorporate breaker mechanism in the apparatus itself so that such larger pieces of material can be broken into smaller components more susceptible to efficient reduction by the compaction mechanism 48. An apparatus having such a breaker mechanism is illustrated in FIGS. 6 through 8, and will now be described.

It may be stated initially that the modified apparatus 10' corresonds in substantially all of its particulars to the apparatus 10 heretofore described with the exception of the inclusion in the receiver of a breaker mechanism 129 and for the inclusion of coil-forming mechanism 130. Accordingly, it is therefore both advantageous and convenient to use the primed form of the same numerals in FIGS. 6 through 8 to identify the respectively corresponding elements in the apparatus 10 illustrated in the FIGS. 1 through 5. In that all of the respectively corresponding counterpart elements are substantially the same in structure and function, they will not be further described.

The breaker mechanism 129 includes a stationary grating 131 located within the receiver chamber 21' adjacent the lower end thereof and extending transversely thereacross. The grating 131 comprises a plurality of longitudinally spaced, transversely extending bars that are welded or otherwise fixedly related to the downwardly inclined sidewalls 41' and 42' of the receiver 19'. The breaker mechanism 129 further includes a rotor 132 having a center shaft 134 journaled for rotation adjacent opposite ends thereof in bearing structures 135 and 136 fixedly secured to the frame structure 20'. The shaft 134 is adapted to be rotatably driven, and it extends outwardly beyond the bearing 136 and is equipped thereat with a sprocket 32' having a chain 34' entrained thereabout. As illustrated in FIG. 8, the chain 34' is also entrained about a sprocket 58' fixedly related to the roller 47' so as to rotate therewith. Accordingly, the rotor 132 is rotatably driven whenever the rollers 46' and 47' are driven, as explained hereinafter.

Figure 6:
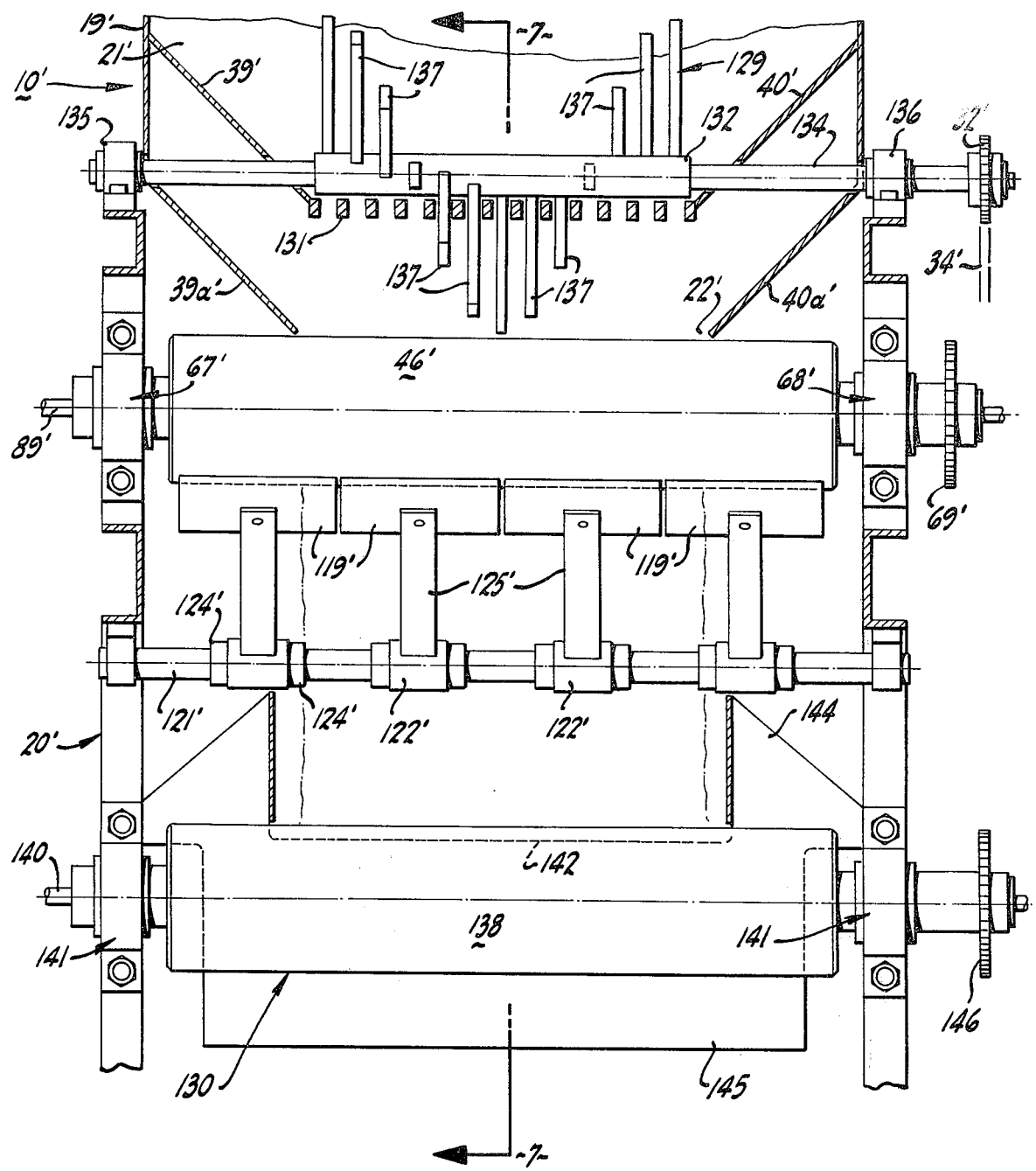
FIG. 6 is a broken longitudinal vertical sectional view, similar to that of FIG. 2, showing a modified form of the invention, the section being taken generally along the line 6—6 of FIG. 8.

The rotor 132 is equipped with a plurality of longitudinally spaced, radially disposed fingers 137 that respectively align with the spacing between the bars defining the grating 131, as is evident in FIG. 6. Thus, as the rotor 132 rotates, the fingers 137 pass downwardly between the spaced bars 131 to cooperate therewith in breaking material disposed therebetween. As is evident in both FIGS. 6 and 7, the fingers 137 are also spaced apart angularly in a relatively uniform disposition, the purpose of which is to have the fingers mate with the bars of the stationary grating 131 progressively or in sequence so that less power is required to turn the rotor 132 against any mass of material supported upon the grating and therefore interposed between the grating bars and the rotor fingers. It will be apparent that no such mass of material to be broken ever engages substantially all of the fingers 137 at one time because their angular spacing, and in contrast thereto, such material is engaged in a progressive fashion by the fingers so that the torque required to turn the rotor is essentially only that required to break the mass of material interposed at any moment between one of the fingers 137 and the stationary grating 131. The receiver 19' has auxiliary end walls 39a' and 40a' respectively underlying the end walls 39' and 40' so as to direct broken material passing through the grating 131 toward the outlet opening 22' whereas the end walls 39' and 40' direct larger chunks of material to the grating 131.

The coiling mechanism 130 comprises a pair of rollers 138 and 139 constructed and arranged in substantially the same manner as the rollers 46' and 47' with which they are respectively aligned in vertical parallelism, as shown in FIG. 7. Thus, the rollers are respectively equipped with heating elements 140, and they are journaled for rotation in bearing structures 141 adjacent each end thereof that are fixedly secured to the frame structure 20'. The coiling rollers 139 and 141 are adapted to receive the sheet-like material peeled from the rollers 45' and 46' by the scraper structures 117' and 118' and rotate the same into a helical, generally cylindrical coil 142, as shown in FIG. 7. The coil 142 is generally located within a three-sided guide structure 144 fixedly related to adjacent components of the frame structure 20', and provided along its open side with a downwardly and outwardly inclined chute 145 through which a completed coil may be displaced from the apparatus 10'.

Whereas the rollers 45' and 46' rotate in opposite angular directions, as indicated by the directional arrows in FIG. 7, the coiling rollers 138 and 139 rotate in the same angular directions, namely clockwise as seen in FIG. 7. For purposes of effecting such rotation thereof, the rollers 138 and 139 are respectively equipped with sprockets 146 and 147 about which is entrained an enless chain 148 that is also entrained about a sprocket mounted upon the output shaft of the drive motor 64'. Accordingly, the sprockets 146 and 147 together with the rollers 138 and 139 with which they are respectively associated are driven concurrently in the same angular directions and at the same angular velocities whenever the motor 64' is energized. The rollers 46' and 47' are respectively equipped with sprockets 69' and 58' which have a chain 62' drivingly connected therewith in a reverse orientation so as to rotate the sprockets and rollers in opposite angular directions. The chain 62' is entrained about a sprocket mounted upon the output shaft of the motor 64', and it passes about a plurality of idler sprockets 149, 150, and 151 to enforce therein the requisite engagement with the sprockets 58' and 69'. Accordingly, whenever the motor 64' is energized, the rollers 46' and 47' are driven in opposite angular directions, the coiling rollers 138 and 139 are driven in the same angular direction, and the rotor 132 of the breaker mechanism 129 is also rotatably driven.

The apparatus 10' functions for the most part in the same manner as the apparatus 10 heretofore described except that the receiver 19' is able to accommodate large pieces of material delivered thereto as well as finer materials such as pulverulent or particulate material. Such smaller material passes freely through the grate 131, and larger pieces of material are broken into smaller pieces which also pass through the grating because of the cooperation therewith of the fingers 137. The material, whether small pieces that pass freely through the grating 131 or larger pieces that must be reduced in size by the breaker mechanism 129, once having passed through the grating 131 are processed by the compaction mechanism 48' in the same manner as previously explained, and the scraper structures 117' and 118' respectively cooperate with the rollers to peel fused material therefrom.

The fused material that moves downwardly from the rollers 46' and 47' after being peeled therefrom is steamer or sheet-like, as previously explained, and it is maintained in a relatively soft state by the elevated temperature of the coiling rollers 138 and 139 which, because of their rotation, are effective to coil such material into a log or roll, thereby further increasing the density of the mass of material over the density thereof which would result because of the accordion-type folds assumed by the material after passing through the rollers 46 and 47 in the apparatus 10, as previously explained. After the coil 142 has reached an appropriate size, it is simply ejected from the apparatus 10' along the chute 145 in any suitable manner, manually in the particular apparatus under consideration.

In either form of the apparatus, it is effective to reduce a low density mass of material to higher density mass thereof, thereby contributing significantly toward obviation the dispoal problem incident to low density materials. In that respect, pulverulent or dusk-like material such as those incident to grinding polystyrene foam and the like occupies a large volume and is not significantly compactible. The reduction accomplished by the apparatus is of the general order of 30 to one, and the end product is a solid, higher densiy, low volume mass that is fracturable or breakable which further facilitates disposal in that it can be further compacted if necessary by breaking it into fragments to the extent necessary to conform the same to the space available.

The blades 119 and 120 (or 119' and 120') are steel blades, in the paticular embodiment of the invention being considered, coated with a material having a relatively low coefficient of friction that resists adhesion thereto such as Teflon, as previously explained. The blades can also be water cooled where necessary, as in installation in which very high temperatures are required by the rollers 46 and 47. Thermostatic controls for maintaining a relatively accurate operating temperature for the rollers 46 and 47 may be incorporated in the apparatus, as previously explained; and the temperature-time parameters respectively defined by the roller temperature and angular velocity thereof varied in relation to the particular material with which the apparatus is used.

The adjacent facing surfaces of the rollers 46 and 47 (and rollers 46' and 47') are spaced from each other by a distance corresponding to the thermal transmission characteristics of the particular material with which the apparatus is being used. That is to say, material such as expanded polystyrene foam are relatively poor heat conductors, thereby requiring a relatively long time period for heat transmission through a significant thickness thereof. The relatively long time period provided by the angular spacing between the flaps 44 and 45 and respectively associated blades 119 and 120 in part accommodates the long time period required; but reducing the spacing between the rollers to a dimension related to the thermal transmission characteristics of the material reduces the requisite time period by limiting the thickness of the material to a value accommodated by the apparatus in large scale production.

As a specific example using expanded polystyrene foam, it may be said that such material is a relatively effective thermal insulator. Accordingly, whereas a thin surface layer of the material will soften or melt when in engagement with a surface having the requisite temperature, exceedingly long time periods are required for the heat to be transmitted to a significant extent beyond the surface layer actually in contact with the heated component. Further, increasing the temperature of the heated component does not in any proportional sense increase the rate of heat transmission through the material, but it does tend to burn the surface thereof. Thus, exceedingly long time perioids are required to soften polysyrene foam having a substantial thickness. Evidently, then, if the thickness of the foam material can be reduced to a surface layer, the rate at which the material can be softened is tremendously accelerated. It has been found that with polystyrene foam a thickness that produces excellent results is approximately one-sixteenth of an inch. Accordingly, in the specific example being considered, the rollers 46 and 47 are spaced apart at the facing surfaces thereof by a distance of approximately one-sixteenth of an inch, thereby limiting the thickness of the foam material to that dimension and, therefore, substantially reducing the time parameter otherwise required to soften a comparable volume of material having a greater thickness.

Additionally, passing the thin layer of material intermediate two rollers 46 and 47 enables such layer of material to be heated from each side thereof which further accelerates the softening rate. The blades 119 and 120 are effective to remove substantially all of the softened material so as to keep the surface rollers essentially clean and thereby permit intimate engagement therewith of quantities of material present in the receiver chamber 21 as each increment of the roller surface advances thereinto past the respectively associated flaps 44, 45.

A temperature gradient is present along the length of each roller 46 and 47 with the higher temperature values being adjacent the center areas thereof. The inclined hopper walls 39 and 40 direct the material within the chamber 21 downwardly toward such center areas. In the particular embodiments of the apparatus shown, the bearing supports for the rollers tend to be insulated in part from the higher temperatures at the center portions thereof, thereby permitting use of low cost bearings and lubricants therefor. In this respect, the shell 51 of each roller may be formed of a mild steel, and the ends 49 and 50 fabricated of stainless steel.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. Apparatus for reducing a low density, thermoplastic foam material to a higher density mass thereof, comprising: frame structure; a receiver supported by said frame structure and having an inlet through which quantities of such low density material are admitted and an outlet through which material leaves; and compaction mechanism in communication with said outlet for receiving material therefrom and operative to concentrate such material into a higher density mass, said compaction mechanism including heater structure for heating such material to the softening temperature thereof, a pair of rollers having facing surface areas adapted to pass such heat softened material therebetween while compressing the same, drive mechanism for rotating said rollers, each of said rollers being equipped with a heating element effective to elevate the temperature of the cylindrical surface of said roller to provide said heater structure which heats a relatively thin layer of such material to the softening temperature thereof, the heating element with which each of said rollers is equipped extending substantially from end to end thereof, means associated with each of said rollers for supporting the associated heating element for thermal expansion and contractions in generally longitudinally directions, and electric connector means associated with each of said rollers for establishing electrical connection with the heating element thereof and effective to accommodate such longitudinal expansions and contractions thereof.

* * * * *